United States Patent [19]
Hegen et al.

[11] Patent Number: 5,921,698
[45] Date of Patent: Jul. 13, 1999

[54] MOUNT FOR PANEL-SHAPED COMPONENTS

[75] Inventors: Dieter Hegen, Kreuzwertheim; Wolfgang Kemmer, Wurzburg, both of Germany

[73] Assignee: Mero-Raumstruktur GmbH & Co. Wuerzburg, Wurzburg, Germany

[21] Appl. No.: 08/673,170

[22] Filed: Jun. 26, 1996

[30] Foreign Application Priority Data

Jul. 3, 1995 [DE] Germany .............................. 195 23 674

[51] Int. Cl.⁶ .................. E04B 2/88; E04B 1/38; E04F 13/08; E04D 3/06
[52] U.S. Cl. .................. 403/263; 403/260; 403/141; 403/131
[58] Field of Search .................. 403/263, 260, 403/259, 256, 253, 131, 141–143, 41, 76, 122; 52/235, 509

[56] References Cited

U.S. PATENT DOCUMENTS

| | | | |
|---|---|---|---|
| 100,868 | 3/1870 | Cushing | 403/143 X |
| 753,329 | 3/1904 | Tate | 403/76 X |
| 1,377,355 | 5/1921 | Knapp | 403/141 X |
| 4,689,928 | 9/1987 | Dutton et al. | 403/143 X |
| 5,540,514 | 7/1996 | Demars et al. | 403/143 X |

FOREIGN PATENT DOCUMENTS

| | | | |
|---|---|---|---|
| 1952446 | 4/1971 | Germany | 52/235 |
| 34 17 225 C2 | 8/1986 | Germany. | |
| 40 32 541 C2 | 7/1992 | Germany. | |
| 43 40 509 A1 | 6/1995 | Germany. | |

*Primary Examiner*—Anthony Knight
*Attorney, Agent, or Firm*—Darby & Darby

[57] ABSTRACT

The invention concerns a mount for panel-shaped components, in particular glass panels, with a base element that penetrates through an opening in the panel-shaped component and immobilize it, and a ball stud that has at its first end a ball element which is rotatably mounted in an opening of the base element which is complementary in form and function, and that can be fastened at its second, opposite end to a support structure, immobilizing the base element. The base element has an axial length such that at least one end of the base element projects out of the panel plane, the opening to receive the ball element being furthermore arranged in the region of that end. The base element has at least two base subelements that can be fastened to one another at their mutually facing radial surfaces in the radial plane of the base element that extends substantially through the center point of the ball element, thus enclosing the ball element.

12 Claims, 2 Drawing Sheets

MOUNT FOR PANEL-SHAPED COMPONENTS

BACKGROUND OF THE INVENTION

1. Field of the Invention

The invention concerns a mount for panel-shaped components as defined in the preamble of claim 1.

The mount according to the invention can be utilized, in essentially any desired manner, for all kinds of panel-shaped components, for example wooden panels, light alloy panels, plastic panels, or the like, be they single-layer or multiple-layer plate elements such as sandwich structures, especially when it is important to mount the plate-shaped components substantially without bending torques. Preferably, however, the application area is made of glass panels, in particular in the construction sector, which because of their structure are particularly susceptible to breakage if bending torques occur.

2. Discussion of the Related Art

EP 0 201 212 B1 discloses a mount of this type in which mounting of the structural element occurs by means of a ball-joint stud which is rotatably mounted in a sleeve-like component that can be fastened in clamped fashion to the structural element, the ball joint being arranged so that its center point lies in the center plane of the panel-shaped structural element. Although this known mount is substantially free of bending torques, production of the mount is complex, since the ball must be pressed into the sleeve. A further disadvantage of this known mount is that because of the position of the ball joint in the opening, the latter must necessarily have a relatively large diameter.

French patent application FR-A-92 06 453 discloses a mount that corresponds substantially to the mount according to EP 0 201 212 B1, although the ball socket is split so as to facilitate assembly of the ball joint. The two parts of the ball socket are welded after assembly. A further particular disadvantage with this known mount, however, is the fact that the weld seam is arranged in the region of the opening in the panel-shaped component, i.e. in a region with elevated accuracy requirements. This generally requires that an accurate, exclusively recessed weld seam be produced, or that the weld seam region be reworked.

Also known, from DE 39 27 65353 C2, is a mount for mounting glass panels without bending torques, in which the ball joint is located outside the region of the glass panel. Here again, however, the ball joint connection is produced in a complex fashion, by pressing the ball into the socket.

SUMMARY OF THE INVENTION

Proceeding from this prior art, the object of the present invention is to create a mount of the aforesaid type that can be produced simply, easily, and economically.

The mount according to the invention, which is suitable in particular for glass panels, has first of all, in known fashion, a base element that penetrates through an opening in the panel-shaped component and thereby immobilizes it, and a ball stud. The ball stud is equipped at its first end with a ball element. For purposes of the present invention, "ball element" means not necessarily an entire ball, but rather a component that has spherical partial surfaces at least in the region in which articulated pivoting, or rotation, occurs during use as intended. According to the invention, the ball element is rotatably or pivotedly mounted in an opening of the base element that is complementary in form and function. The ball stud can be fastened, at its second end located opposite to the ball element, to a support structure, for example to the facade of a building, immobilizing the base element and therefore also the panel-shaped component.

In contrast to the mount known from EP 0 201 212 B1, the base element of the invention has an axial length such that at least one end of the base element projects out of the panel plane. The opening to receive the ball element, i.e. ultimately the ball joint itself, is arranged in the region of that end outside the panel-shaped component. As a consequence of these features of the invention, it is possible to select the opening in the region of the panel-shaped component independently of the dimensions of the ball joint; in particular, it can be smaller than the latter, theoretically making possible more esthetically attractive fastening systems for glass panels, for example.

Furthermore, the base element is configured in multiple parts and has, according to the invention, at least two base subelements. The base subelements are configured and arranged so that the parting line extends in substantially that radial plane of the base element which intersects the center point of the ball element. The base subelements can be fastened to one another at their mutually facing radial surfaces, forming a ball socket and enclosing the ball element. All in all this allows simple, easy, and accurate production of the mount according to the invention.

Joining of the two base subelements can be accomplished positively or non-positively in theoretically any desired manner, for example by bolting, riveting, or the like. Preferably, however, the two base subelements are easily joined to one another by welding, in particular with a laser or frictional welding method.

For attaching the base element to the panel-shaped component, according to a preferred exemplified embodiment the first base subelement has, at its end pointing away from the ball stud, a flange-like peripheral rim region that can be brought into contact against the panel-shaped component. Contact can be made indirectly—i.e. with, for example, elastomer washers or the like interposed—or directly. The rim region can be shaped integrally onto the first base subelement, for example in the form of a continuously or interruptedly peripheral annular flange. According to a further exemplified embodiment, the rim region is constituted by a part which projects at least regionally in the radial direction beyond the first base part, and can be fastened like a cover to the end surface of the first base subelement.

According to a further exemplified embodiment, instead of a rim region configured in the manner of a flange, the first base subelement can have, at its end pointing away from the ball stud, a substantially conically chamfered rim region that can be brought directly or indirectly into contact against a chamfered surface, complementary in form and function, arranged in the region of the opening in the panel-shaped element. This configuration makes possible, in particular, substantially flush fastening of the base part to the panel-shaped structural element.

The base element or the first base subelement can furthermore be arranged directly, for example with the base subelement contacting the inner surfaces of the opening, in the opening of the panel-shaped component being immobilized in theoretically any desired manner. Preferably, however, a sleeve is arranged on, in particular slid onto, the first base part in the region of the opening. The sleeve can be arranged and configured so that the sleeve wall regions extend radially and/or axially between the first base subelement and the associated surfaces of the panel-shaped component. Preferably the sleeve is made of plastic or light alloy, in particular of aluminum or an aluminum alloy. The sleeve can be equipped with a corrosion- and/or friction-reducing coating, in particular coated with Teflon.

According to a further exemplified embodiment, fastening of the mount to, for example, a glass panel occurs by clamping. For this purpose, the base element has, at least in sections, external threads onto which a fastening ring can be screwed in the manner of a coupling nut, so that the panel-shaped component is clamped indirectly or directly between the flange-like peripheral or chamfered rim region of the first base subelement and the fastening ring.

According to a particularly preferred exemplified embodiment, the external threads on the first base subelement are arranged so that the parting line between the first and the second base subelement extends outside the fastening ring with reference to the panel-shaped component being clamped. In other words this means that, for example, a weld seam running around the parting line does not extend inside the opening in the panel-shaped component (and optionally in a corresponding sleeve), so that the requirements for accurate fit and dimensional accuracy in the region of the weld seam can be greatly reduced.

As described above, the fastening ring can be configured most simply as a ring similar to a coupling nut. In particular, however, when the region of the parting line is to be covered, for example for esthetic reasons, or the region of the ball joint is to be covered, for example in order to make it difficult for dirt particles to penetrate, the fastening ring can have a sleeve-like step that, when the fastening ring is screwed on, axially overlaps at least the region of the parting line, but preferably the entire second base subelement, leaving a radial clearance. The cavity between the second base subelement and the sleeve-shaped step can be filled at least regionally with a sealing agent.

Lastly, the mutually facing surfaces of the first and the second base subelements in the region of the parting line can be stepped in functionally complementary fashion in axial section, so that overall a centering collar is formed in a known manner.

BRIEF DESCRIPTION OF THE DRAWING FIGURES

The invention will be explained in more detail below with reference to drawings that show merely exemplified embodiments. In the drawings:

FIG. 1 shows, schematically in longitudinal section, a first exemplified embodiment of a mount according to the invention; and FIG. 2 shows, in a depiction corresponding to FIG. 1, a second exemplified embodiment of a mount according to the invention.

DETAILED DESCRIPTION OF A PREFERRED EMBODIMENT

Figure 1:
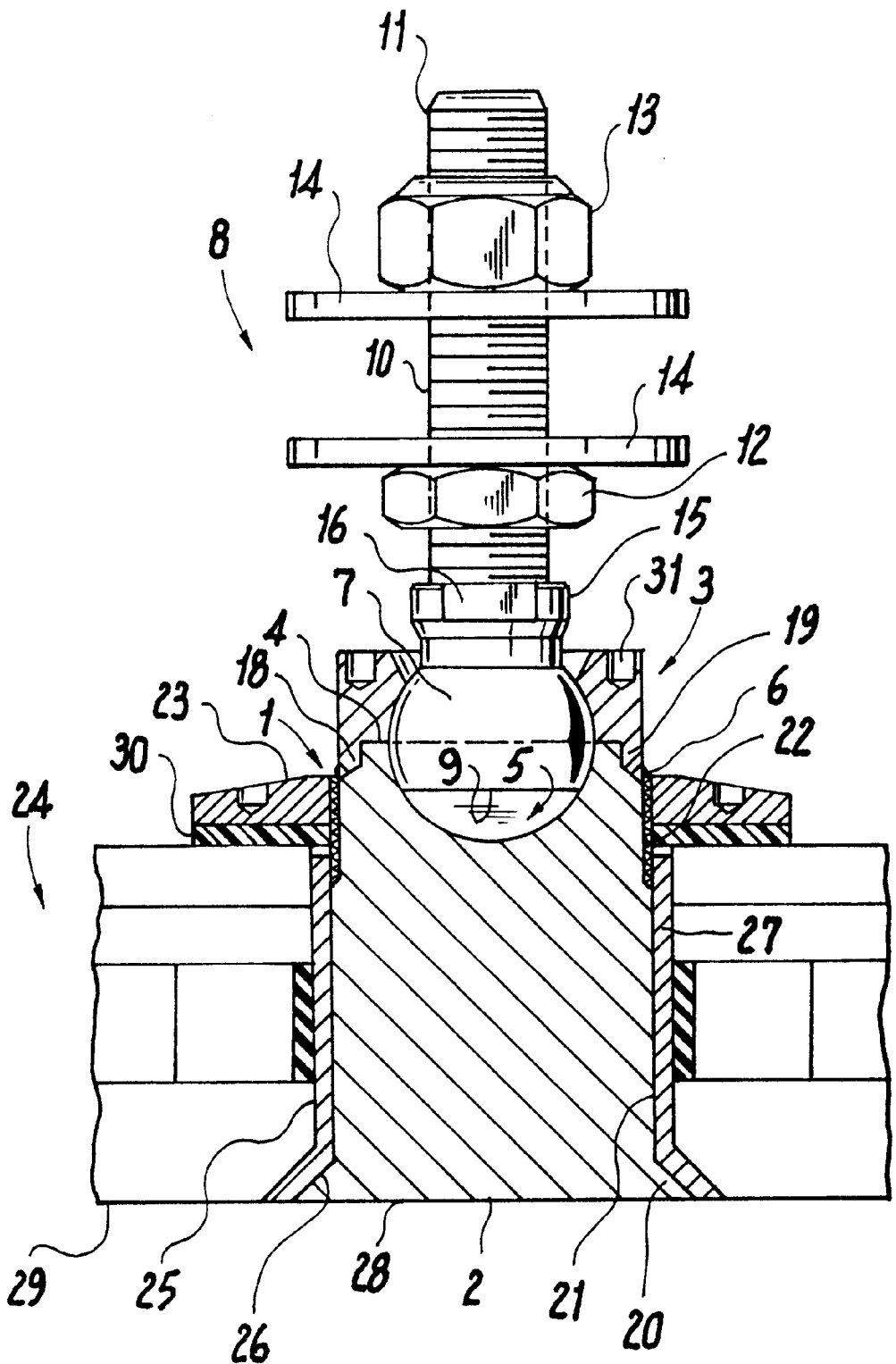

FIG. 1 depicts a first exemplified embodiment of the invention in axial section. The mount depicted therein has a base element 1 with a first base subelement 2 and a second base subelement 3, as well as a ball stud 8 mounted in articulated fashion in base element 1.

A ball element 7, which has a flattened area 9 at its end pointing away from ball stud 8, is arranged at the first end of ball stud 8. Shaft 10 of ball stud 8 is equipped over substantially its entire length with external threads 11, onto which a lock nut 12 and a fastening nut 13 in the form of a self-locking nut can be screwed. The ball stud can be fastened, with shim washers 14 interposed, to a support structure (not depicted) by means of the two nuts 12, 13, which can be tightened against one another. Ball stud 8 has between shaft 10 and ball element 7, in a known manner, a collar 15 with flattened areas 16 arranged diametrically opposite one another, for engagement of a tool, for example a wrench.

The two base subelements 2 and 3 are joined together, in particular are welded together by means of a weld seam 6 produced by a laser welding method, in the region of a parting line 4 to form a ball socket 5 for ball element 7, ball element 7 of ball stud 8 being simultaneously enclosed during the production of the weld join. Ball stud 8 engages with its shaft 10 through an opening 17, open in the axial direction, in the end-surface region of second base element 3. Opening 17 is chamfered in order to increase the pivot range of ball stud 8 in the ball joint.

As is evident from the depiction in FIG. 1, parting line 4 and the parting line plane extend through the center point of ball element 7 and ball socket 5. In other words, this means that when the mount is produced, ball stud 8 and ball element 7 can first be set, without exerting force, into the lower half of ball socket 5 configured in first base subelement 2, whereupon second base subelement 3 is then placed, from above in the depiction in FIG. 1, onto ball stud 8, and welded to first base subelement 2 in the peripheral region of parting line 4.

In order to ensure accurate mutual positioning of first and second base subelements 2, 3, in particular during the welding procedure, first base subelement 2 has, radially externally in the region of its end surface facing toward ball stud 8, a step 18 extending back in the axial direction; and second base subelement has, also radially externally in the region of its end surface facing toward the first base subelement, a step 19 extending forward in the axial direction. The two steps 18, 19 are configured substantially complementarily in form, and together represent a centering collar for the two base subelements 2, 3.

In the region of the end located away from ball stud 8, second base subelement 2 has a conically chamfered rim region 20 that runs continuously around base subelement 2 and projects radially out from cylindrical enveloping surface 21.

As is further evident from the depiction in FIG. 1, first base subelement 2 has an at least slightly greater diameter than second base subelement 3. Base subelement 2 is equipped, in the region of its end pointing toward ball stud 8, with external threads 22 onto which a fastening ring 23 can be screwed.

In order to install a panel-shaped component 24 (depicted in merely schematic fashion) using the mount according to the invention, component 24 is first of all equipped with a passthrough circular opening 25. The diameter of this opening is at least slightly greater than the outside diameter of base element 1 or base subelement 2, so that it can be inserted, from below in the depiction of FIG. 1, through opening 25. Opening 25 has a chamfer 26 that is complementary in form and function to the chamfered rim region 20 of base subelement 2. Rim region 20 can be brought indirectly, i.e. with a sleeve 27 interposed, into contact against chamfer 26, end surface 28 of base subelement 2 extending flush with external surface 29 of component 24.

Sleeve 27 is configured overall to be substantially complementary in form to base subelement 2 and opening 25, thus resulting in planar contact of sleeve 27 against the inner wall of opening 25 and against the outer wall of base subelement 2. The axial length of sleeve 27 is at least slightly less than the thickness of component 24 in the region of the mount.

Once base element 1, with sleeve 27 in place, has been inserted into opening 25, fastening ring 23 is screwed (from above as depicted in FIG. 1) onto external threads 22 of base subelement 2, and tightened against component 24 with an elastomer washer 30 interposed. Tightening is accomplished by means of a tool (not depicted) that can be brought into engagement in corresponding openings 31 of fastening ring 23.

When the mount according to the invention has been attached to component 24, weld seam 6 is located outside opening 25 and sleeve 27, i.e. in a region in which there are no elevated requirements in terms of dimensional accuracy and accurate fit.

Figure 2:
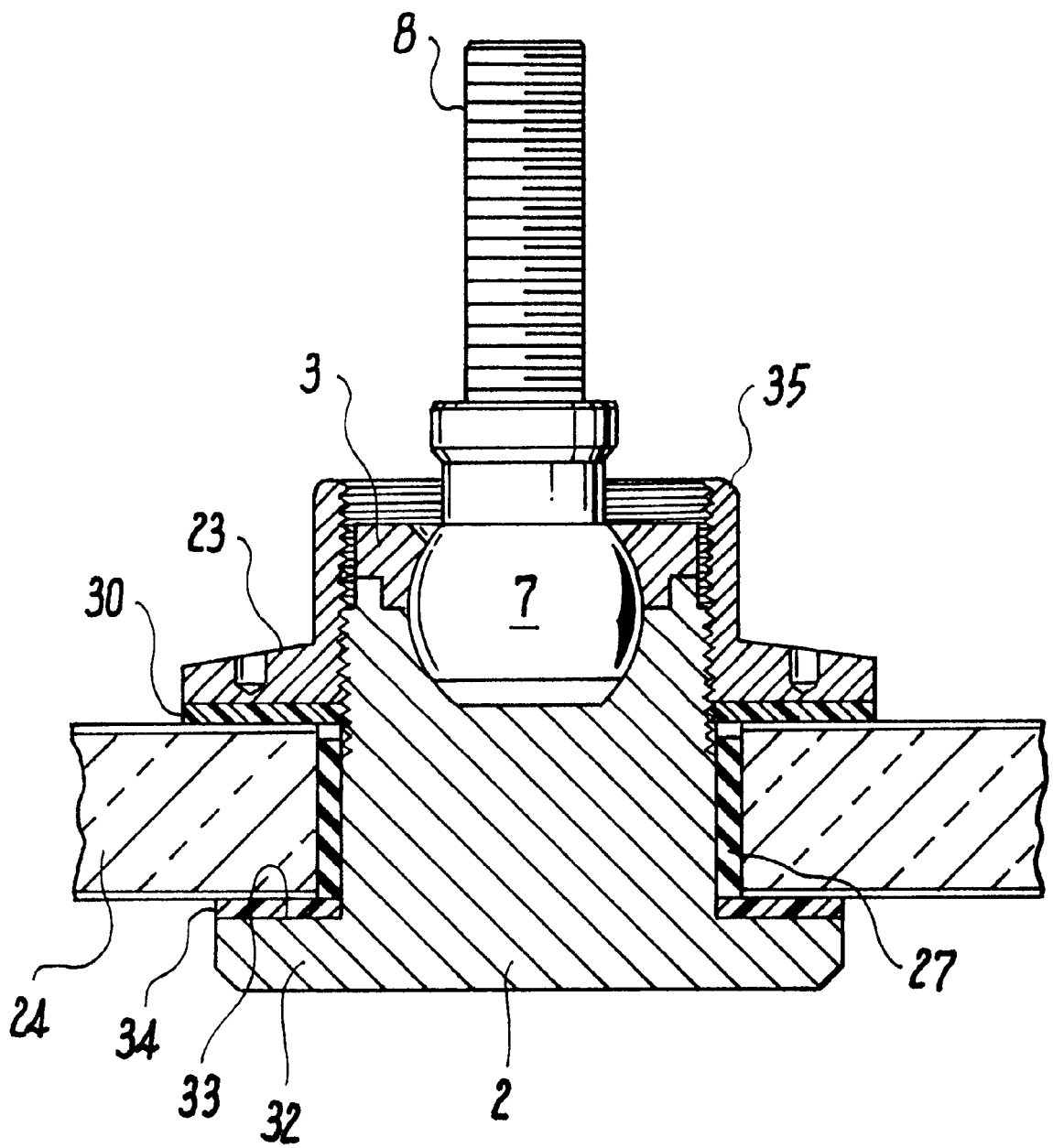

The exemplified embodiment depicted in FIG. 2 has fundamentally the same construction as the exemplified embodiment according to FIG. 1. In the exemplified embodiment depicted in FIG. 2, however, the chamfered rim region 20 of base subelement 2 is replaced by a flange-like peripheral rim region 32 projecting in the radial direction, which comes into indirect contact against component 24 at its surface 33 facing toward it, with an elastomer washer 34 interposed. In this exemplified embodiment, sleeve 27 has a cylindrical shape.

In addition, fastening ring 23 of the exemplified embodiment according to FIG. 2 is equipped with a sleeve-like step 35 that completely overlaps the second base subelement and therefore also the region of parting line 4 and weld seam 6 in the axial direction, leaving a radial clearance; this results in a particularly esthetically attractive covering of the weld seam region.

We claim:

1. A mount for panel-shaped components, in particular glass panels, with a base element that penetrates through an opening in the panel-shaped component and immobilizes it, and a ball stud that has at its first end a ball element which is rotatably mounted in an opening of the base element which is complementary in form and function, and that can be fastened at its second, opposite end to a support structure, immobilizing the base element, wherein the base element has an axial length such that at least one end of the base element projects out of the panel plane; that the opening to receive the ball element is arranged in the region of that end; and that the base element has at least two base subelements each having a ball socket, the at least two base subelements being axially separable for insertion of the ball element into the respective ball sockets and are welded to one another axially at their mutually facing radial surfaces in the radial plane of the base element that extends substantially through the center point of the ball element, thus enclosing the ball element in the ball sockets, the ball element being substantially spherical.

2. The mount as defined in claim 1, wherein the first base subelement has, at its end pointing away from the ball stud, a flange-like peripheral rim region, shaped integrally onto or fastened like a cover onto the end surface of the first base subelement, that can be brought into contact against the panel-shaped component.

3. The mount as defined in claim 2, wherein the base element has, at least in sections, external threads onto which a fastening ring can be screwed in such a way that the panel-shaped component can be clamped between the flange-like peripheral rim region of the first base subelement and the fastening ring.

4. The mount as defined in claim 3, wherein the external threads on the first base subelement are arranged so that the parting line between the first and the second base subelement extends outside the fastening ring with reference to the panel-shaped component being clamped.

5. The mount as defined in claim 4, wherein the fastening ring has a sleeve-like step that, when the fastening ring is screwed on, axially overlaps at least the region of the parting line (4), but preferably the entire second base subelement (3), leaving a radial clearance.

6. The mount as defined in claim 1, wherein the first base subelement has, at its end pointing away from the ball stud, a substantially conically chamfered rim region that can be brought into contact against a chamfered surface, complementary in form and function, arranged in the region of the opening.

7. The mount as defined in claim 6, further comprising a sleeve arranged on the first base subelement in the region of the opening.

8. The mount as defined in claim 7, wherein the sleeve is made of a plastic or a light alloy.

9. The mount as defined in claim 8, wherein the sleeve is made of aluminum or an aluminum alloy, which is coated with Teflon.

10. The mount as defined in claim 6, wherein the base element has at least in sections, external threads onto which a fastening ring can be screwed in such a way that the panel-shaped component can be clamped between the flange-like chamfered rim region of the first base subelement and the fastening ring.

11. The mount as defined in claim 1, wherein the mutually facing surfaces of the first and the second base subelement are stepped in functionally complementary fashion in axial section, so that overall a centering collar is formed.

12. The mount as defined in claim 1, wherein in the fastened position, the mutually facing radial surfaces of the at least two base subelements abut each other.

* * * * *